Nov. 10, 1970  P. EISLER  3,539,768
ELECTRICAL SPACE HEATING SYSTEM

Filed March 9, 1967  12 Sheets-Sheet 1

Inventor
By Paul Eisler
Watson, Cole, Grindle & Watson
Attys.

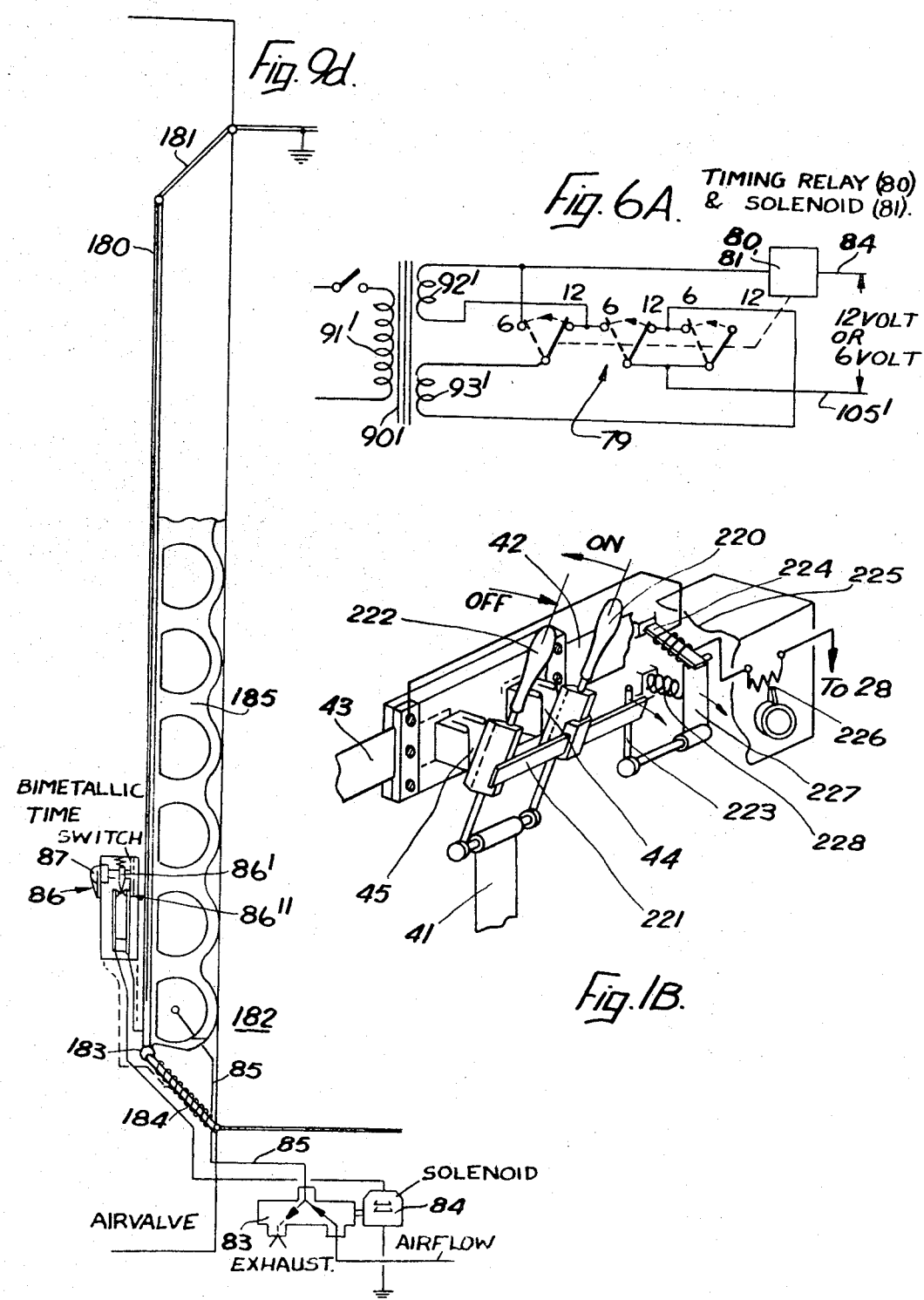

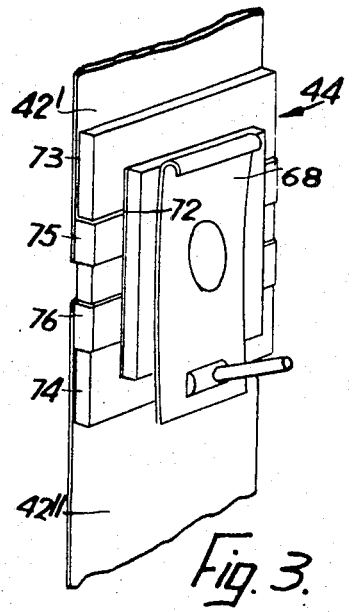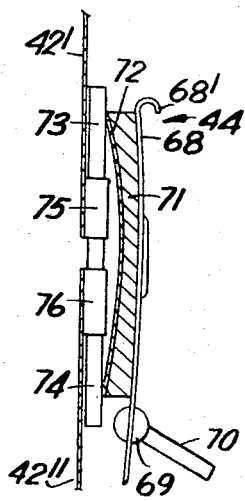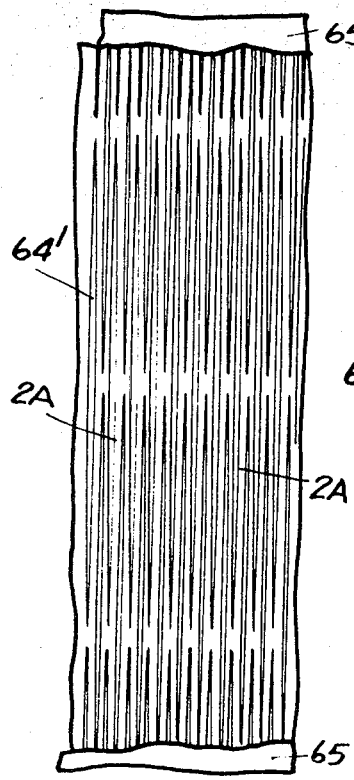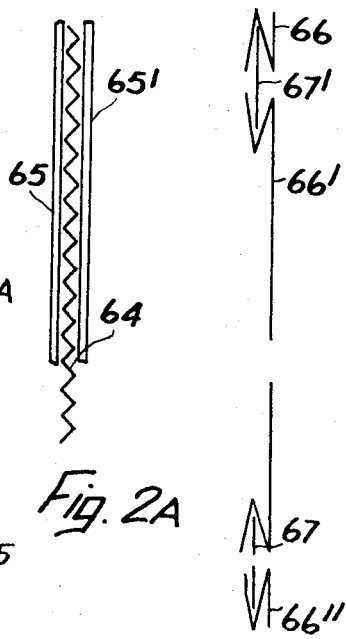

Nov. 10, 1970

P. EISLER 3,539,768

ELECTRICAL SPACE HEATING SYSTEM

Filed March 9, 1967

NORMAL LOAD.

OVERLOAD DISCHARGE.

Inventor
Paul Eisler
By
Watson, Cole, Grindle + Watson
Attys.

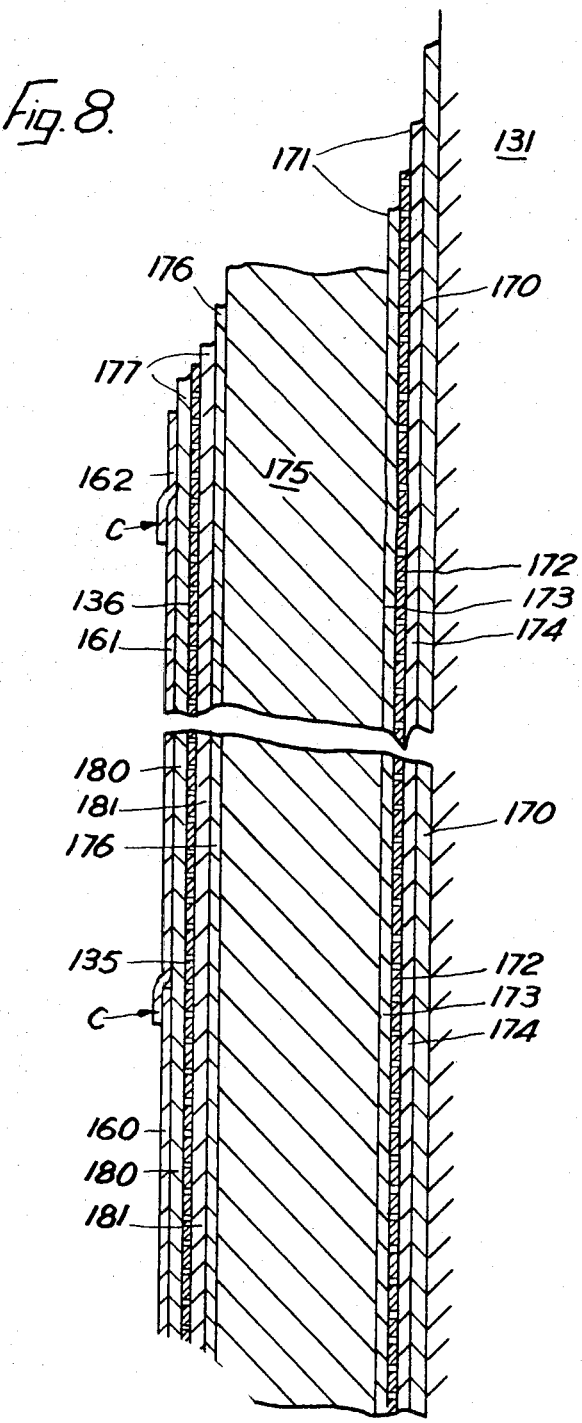

Nov. 10, 1970  P. EISLER  3,539,768
ELECTRICAL SPACE HEATING SYSTEM
Filed March 9, 1967  12 Sheets-Sheet 7
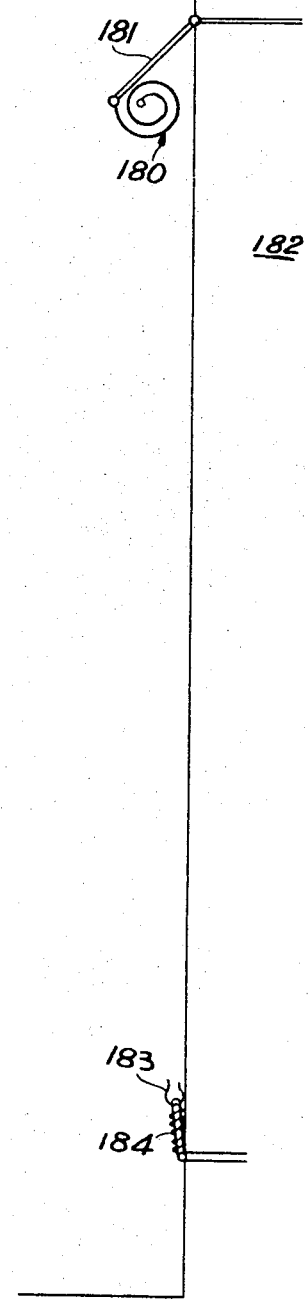
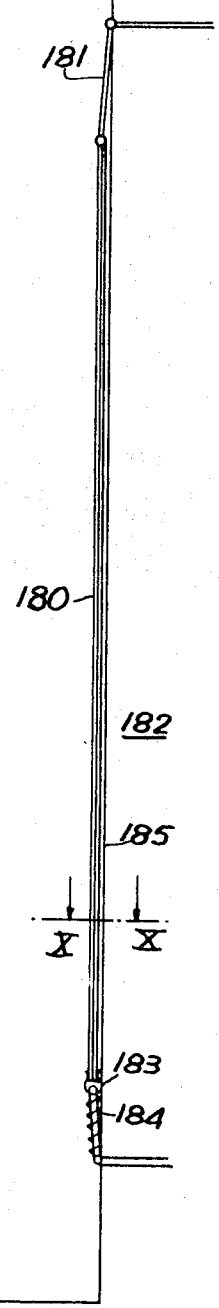
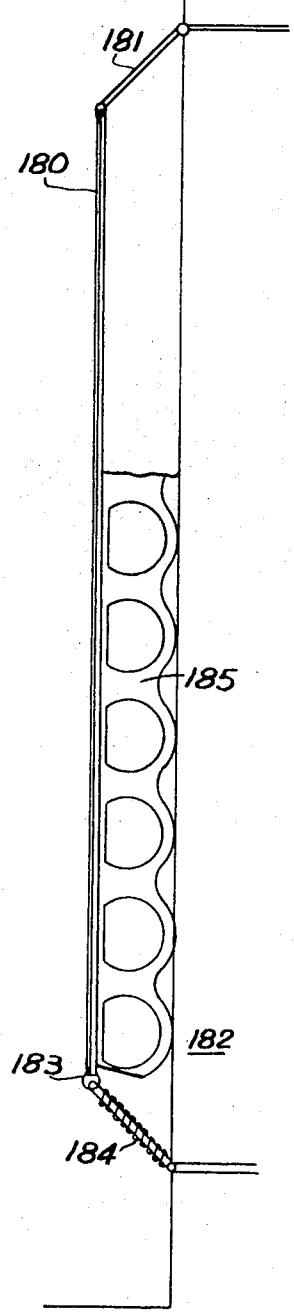
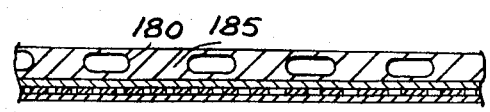
Fig. 10.
Inventor
Paul Eisler
By Watson, Cole, Grindle + Watson
Attys.

United States Patent Office 3,539,768
Patented Nov. 10, 1970

3,539,768
ELECTRICAL SPACE HEATING SYSTEM
Paul Eisler, 57 Exeter Road, London, NW. 2, England
Continuation-in-part of abandoned applications Ser. No. 11,761, Feb. 29, 1960, and Ser. No. 345,424, Feb. 17, 1964. This application Mar. 9, 1967, Ser. No. 621,839
Claims priority, application Great Britain, Mar. 3, 1959, 7,288/59; May 26, 1964, 21,688/64
Int. Cl. H05b 1/00
U.S. Cl. 219—213                                19 Claims

ABSTRACT OF THE DISCLOSURE

Radiant low voltage electric heating films covering a major part of the walls of each of a plurality of rooms normally operate at low power but are switchable, as by area or voltage control, to high power when an occupant enters a room, the power automatically returning to normal after a short time. Supply may be from mains, with a battery for heavy load, e.g., two rooms entered simultaneously. Spacing of the film from the wall may be variable, e.g., by inflatable insulation. Closable slots in front of the film may control radiation and convection. The walls may store heat, heat flow may be controlled by thermal insulation and two spaced films separated by insulation may be used.

---

This invention concerns an electrical space heating system and is a continuation-in-part of my application Ser. No. 345,424 filed Feb. 17, 1964 (now abandoned) which was itself a continuation-in-part of my application Ser. No. 11,761 filed Feb. 29, 1960 (now abandoned).

According to the present invention there is provided an electrical space heating system for heating a plurality of rooms, comprising electrical heating film means carried by and covering at least one of the boundary surfaces of each of said rooms, electrical power supply means for supplying said electrical heating film means with electrical power, and control means, operable when any one room becomes occupied, for causing the electrical heating film means in said one room to emit radiant heat, at a given high rate for an initial period of between one half and ten minutes and, at the expiration of said initial period, for thereafter continuously supplying said one room with heat at a substantially reduced rate of heat input whilst it remains occupied.

Preferably the heating film means cover at least the major part of the surface area of the boundary walls of each room.

With such an arrangement, a person, upon entering any one room may be initially "flooded" with heat, after which the heat supplied by the heating film means may be reduced to a lower level, or switched off completely. Thus the invention provides an electrical space heating system for a plurality of rooms in which an occupant of any one room, may instantaneously feel comfortably warm, although this room, like the remaining rooms, has been maintained at a reduced temperature as long as it was not occupied. The room reverts to this reduced temperature after the occupant has left the room. The space heating system of the invention achieves a saving in the electricity bill because of this timing of the full heating of any one of a plurality of rooms during the period of its occupancy only, without requiring pre-arrangement of such timing by time switches or other programming devices. The low inertia and low temperature of the heating film means provides them with an instantaneous response, and thus movement of the residents from room to room is not hindered by temperature variations since they can freely switch on the heat as and when they enter or are about to enter any one room.

The saving in electricity depends largely on the habits of the occupant or occupants of the plurality of rooms being heated and is greater the more rooms remain unoccupied and the longer periods for which they remain unoccupied in toto. The space heating system of the invention may therefore be described as an "occupation-time-controlled central heating system." If during a heating season, the total occupation period of all rooms is small, the total electrical energy consumed will be relatively small, and may be so small that its cost, even at a relatively high tariff rate, may compare favourably with that of any other known central heating system using even a much cheaper fuel. Thus known central heating systems for heating a plurality of rooms maintain all the rooms at a predetermined, comfortable, and substantially constant temperature whether or not they are occupied whereas, with the present invention, the rooms are only maintained at this comfortable level if and when they are occupied.

Thus the invention provides an electric space heating system giving very high comfort available at low running costs in spite of the relatively high price of electricity.

The electrical heating film means are preferably constituted by metal foils having a large surface area and rapid heat emission properties.

The electrical heating films are preferably carried by a number of the boundary walls of each of the rooms to be heated. The term "boundary walls" as used in this specification is to be understood in a wide sense so as to include, for example, the floor and ceiling of a room, and to include also the case where a space is bounded by a member such as a screen. Preferably the electrical power supply means comprises a main source and a subsidiary source of electrical power. Means may be provided such that current is drawn from the said subsidiary source only when the capacity of the said main source is exceeded. Thus the main and subsidiary sources may be arranged to provide the power for the heating of at least two different rooms each of which is provided with the said heating film means, the said main source being adapted to produce all the power required for the heating of at least one of the rooms even during said initial period but producing less power than is required for the simultaneous heating of all the rooms during the initial period, the additional power required during the initial period being supplied by the said subsidiary source.

The said electrical power supply means may provide current at a higher voltage during said initial period than at other times. Thus the normal supply to any one film may be six volts, this being increased to twelve volts during said initial period, thus increasing the heat input four-fold.

Alternatively, there may be a plurality of heating film means in each room, all of which are connected to said electrical power supply means on the closure of a switch means provided for each said room, the said automatic means for reducing the power supplied serving at least substantially to disconnect some of the heating film means of each room from the electrical power supply means at the end of the said initial period. Preferably the heating film means which are ultimately disconnected from the power supply means cover a greater surface area than the remainder of the heating film means.

Yet a further way in which excess heat can be radiated into a room, is to provide an insulating backing to the heating foil and means for varying the thermal transmittance of the backing from a relatively high value in said initial period to a relatively low value for the remainder of the time the room is occupied. In this way the heat radiated into the room will be large during the initial period and small after this period, since the heat "lost" by conduction into the wall and insulating backing is correspondingly small and large during the initial period and thereafter. The thermal transmittance could be varied by varying the air spacings between the heating film, the insulating backing and the wall.

Also, the room can be flooded with heat by providing a second or "wall" heating film behind the main space heating film for the room. By controlling the heat supplied to the second heating film, the heat output of the first heating film can be controlled. For example, the heat conducted through the insulation from the space heating film to the wall behind both heating films, can be reduced by passing current through the second or wall heating film. The heat radiated into the said room by the space heating film thereby being correspondingly larger. Thus the second or wall heating film may act as a thermal barrier or weir to the heat emitted by the space heating film, preventing heat being conducted backwards from the space heating film until the heat conducted is sufficient to overcome the thermal barrier provided by the second heating film. The heat radiated into the room during this time will be large until the heat barrier is overcome, when the heat radiated will thus be reduced.

Another possibility is to provide a system of insulating slats a little way from a wall covered with a heating film, the slats when closed bounding a closed air space constituting a thermal barrier; the back of the slats is reflective so that radiation is returned to and stored in the wall. By opening the slats radiation into the room is permitted and if the slats are suitably adjusted they can direct convection currents of air into and out of the air space between the slats and the wall. Further the area in front of which the slats are disposed may be greater than the area of the film, the wall surrounding the film also forming a storage mass for heat which can be made use of when the slats are opened.

Thus, there are various ways in which the initial flooding of a room may be effected. For example, (i) the number of heating foils supplied with power may be relatively large during the initial period, the number being reduced afterwards, (ii) the power supplied to a constant number of heating foils may be relatively large during the initial period, it being reduced afterwards (i.e. voltage of the supply may be halved), (iii) a combination of these two may be employed, the number of foils and the power supplied being varied, (iv) the thermal transmittance of an insulating backing may be varied, thus the air gap between the heating foils, the insulating backing and the wall may be varied, (v) a second or wall heating foil and the wall, the second or wall heating foil acting as a heat barrier or weir, (vi) radiation and convection can be controlled by a slat system in conjunction with an air space to constitute a variable thermal transmittance system.

The use of a low voltage supply permits the elimination of solid, impenetrable protective covers of the said heating foils, and permits the use of thin insulating layers. These measures, together with the use of low temperatures only in the heating foils, reduces the time required to raise the temperature of the heating foils to their operating temperature, i.e. they reduce the inertia of the heating foils.

The low voltage supply may be advantageously used not only for the heating foils but also for water heating, cooking, lighting, and electrical appliances.

The invention is illustrated, merely by way of example, in the accompanying drawings, in which:

FIG. 1B is a diagrammatic view to an enlarged scale of the switch means used in FIGS. 1 and 1A;

FIG. 2 is a diagrammatic plan of an electrical heating film forming part of the space heating system;

FIG. 2A is a section on the line 2A—2A of FIG. 2;

FIG. 2B illustrates diagrammatically the manner in which the electrical heating film of FIG. 2 may be connected to a busbar;

FIGS. 3 and 4 are respectively a perspective view and a side view of an alternative form of switch forming part of the switch means shown in FIG. 1B, FIG. 3 showing the switch in the closed position and FIG. 4 showing the switch in the open position;

FIG. 6A is a diagrammatic sketch of a further circuit, illustrating another way of varying the current to the heating films;

FIG. 8 is a diagrammatic cross sectional plan view of a heating film for use in a space heating system according to the present invention;

Figure 11:
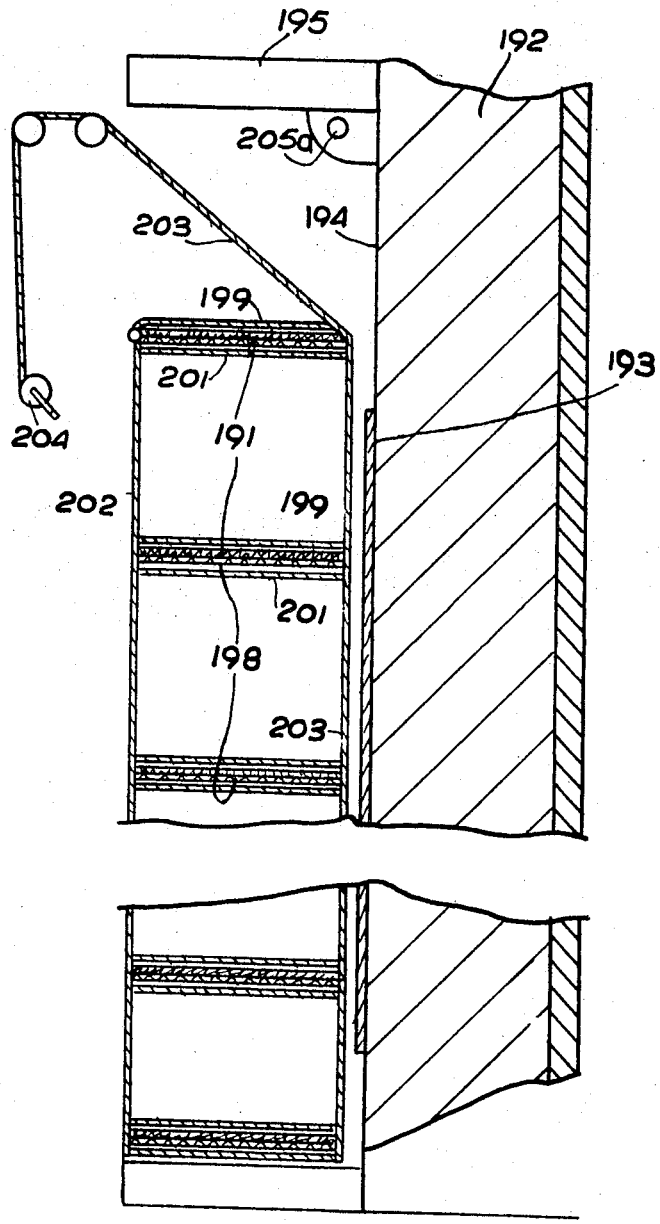
Figure 12:
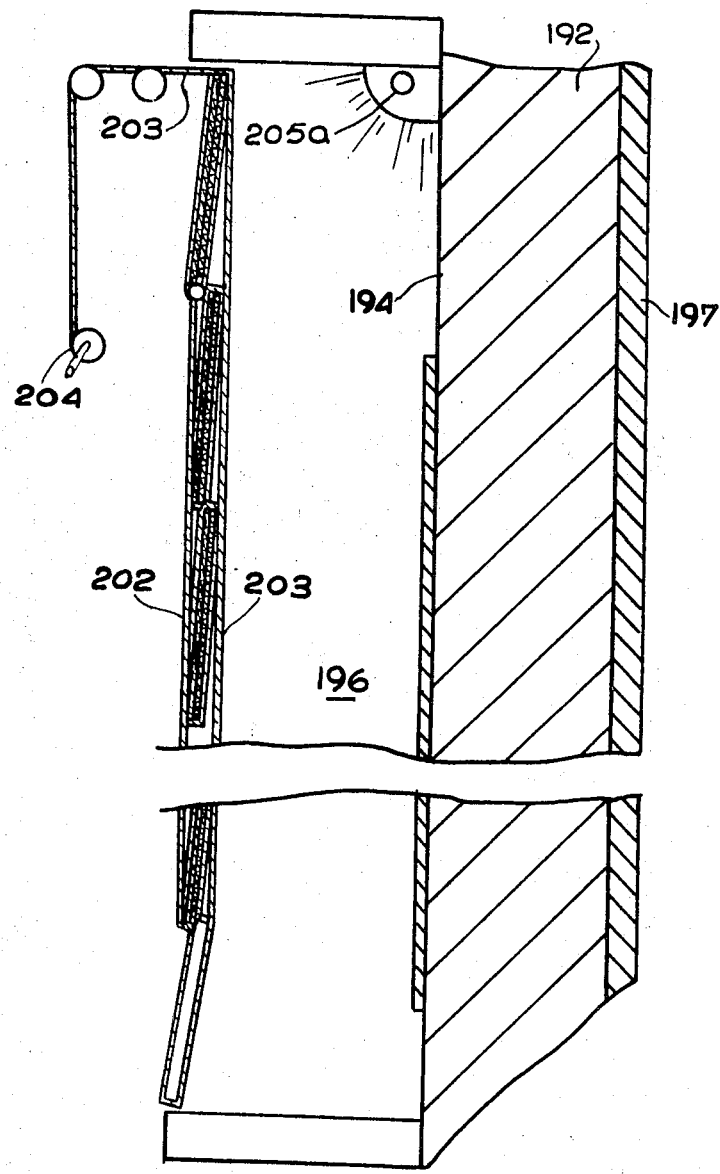
Figure 13:
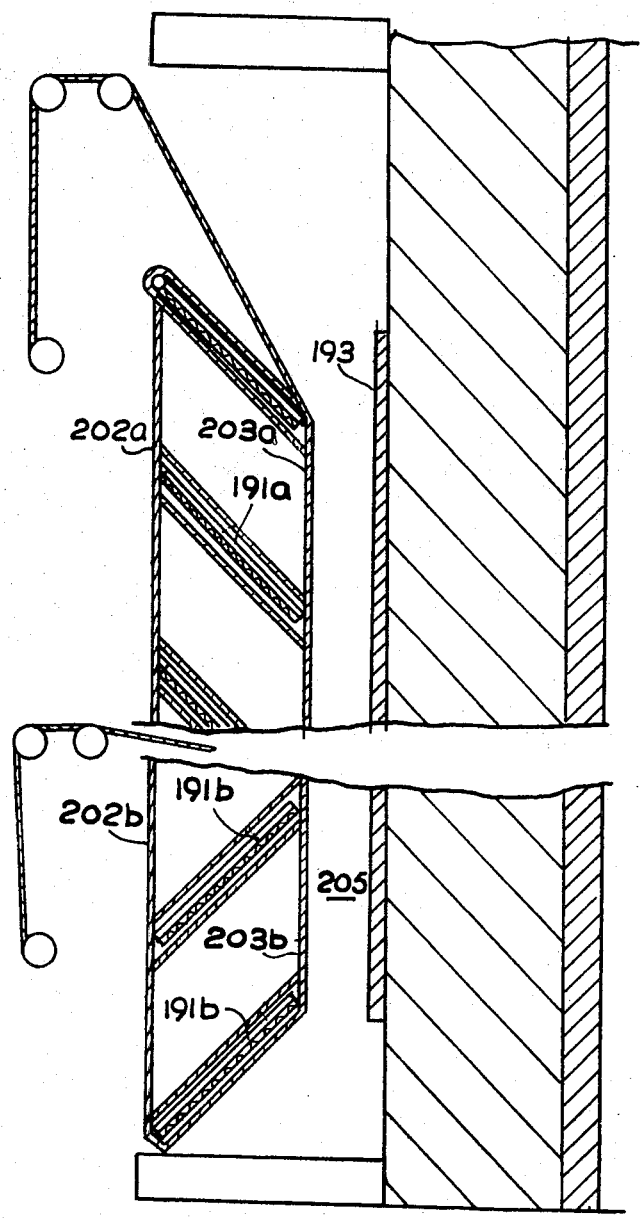
Figure 14:
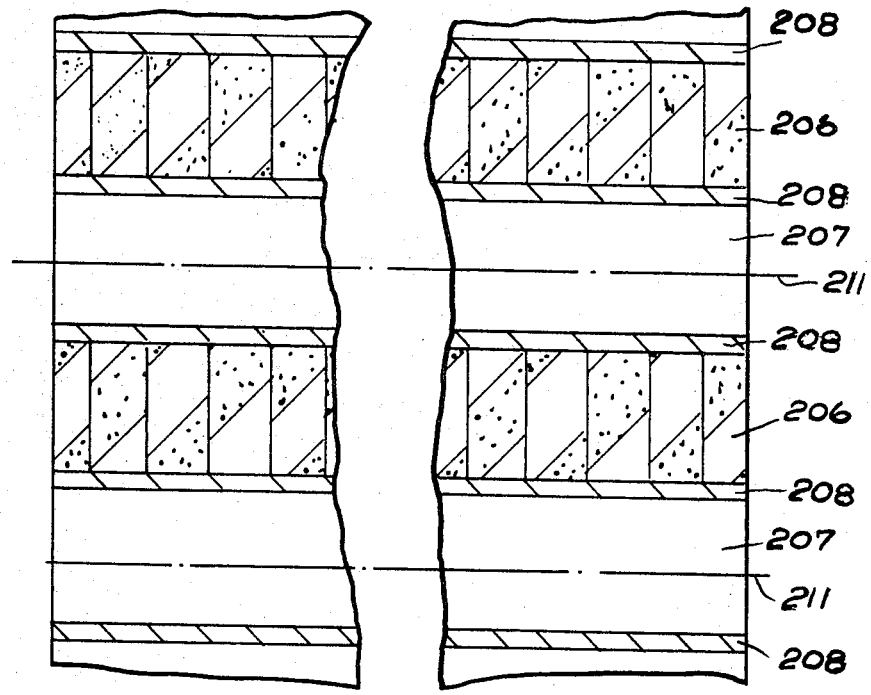
Figure 15:
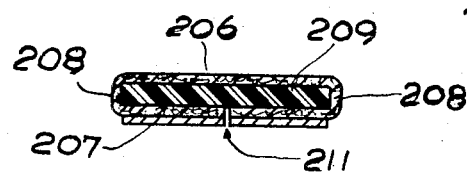
Figure 16:
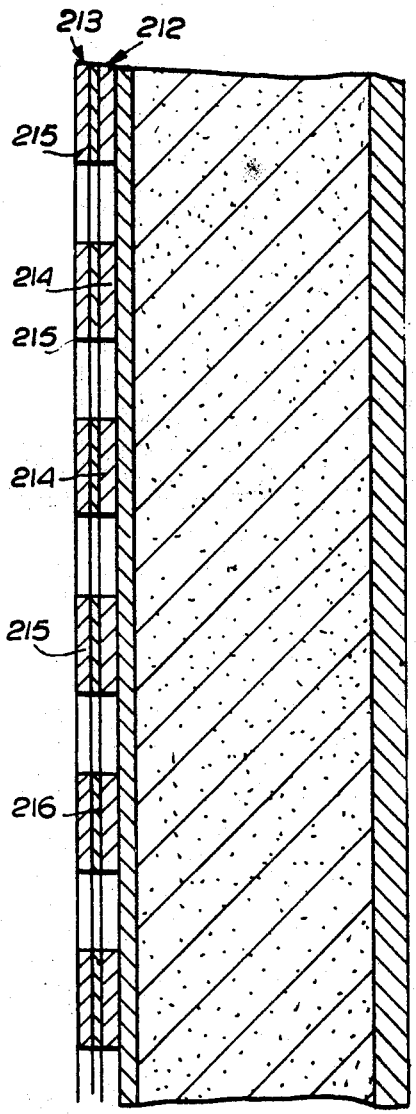
Figure 17:
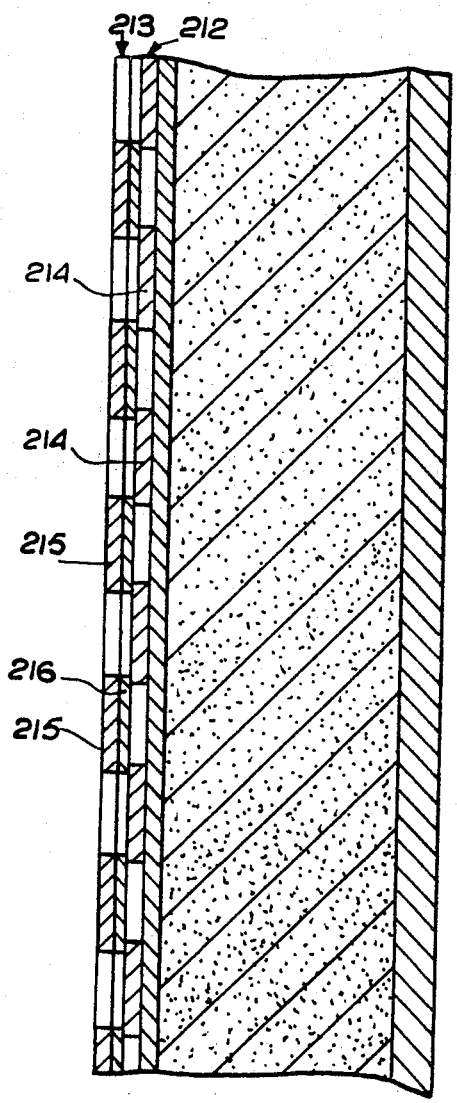

FIGS. 9A, B, C and D are diagrammatic views of a further heating film for use in a space heating system according to the present invention;

FIG. 10 is a cross sectional view on line X—X of FIG 9B;

FIG. 11 is a diagrammatic vertical sectional view of yet another arrangement of heating foil and associated parts for use in a space heating system according to the present invention;

FIG. 12 is a similar view to FIG. 11 but with certain parts in a different position;

FIG. 13 is a similar view to FIG. 12 of a further development;

FIGS. 14 and 15 illustrate steps in the production at the louvres or slats used in FIGS. 11, 12 and 13;

FIGS. 16 and 17 are similar views to FIGS. 11 and 12 of a further modification.

Figure 1:
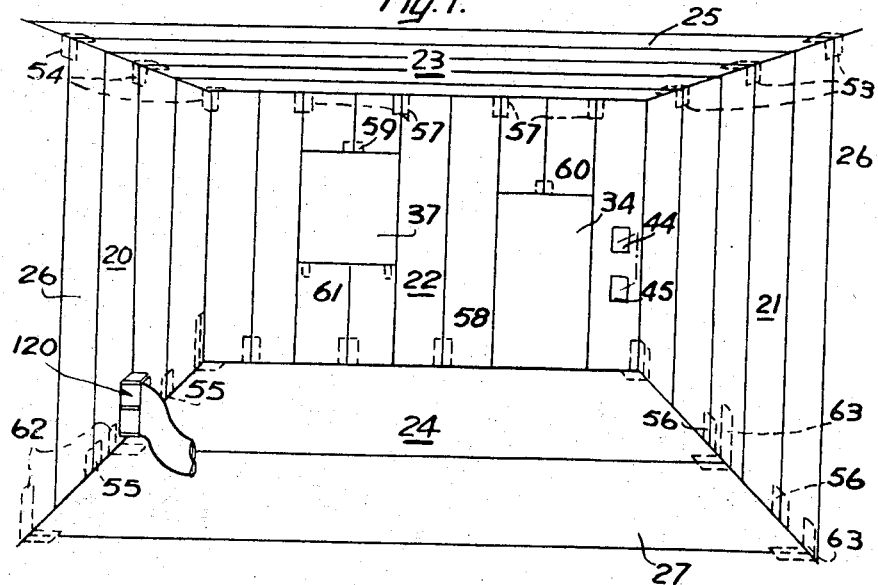
FIG. 1 is a diagrammatic elevation of one of a number of rooms provided with an electrical space heating system according to the present invention.
Figure 1A:
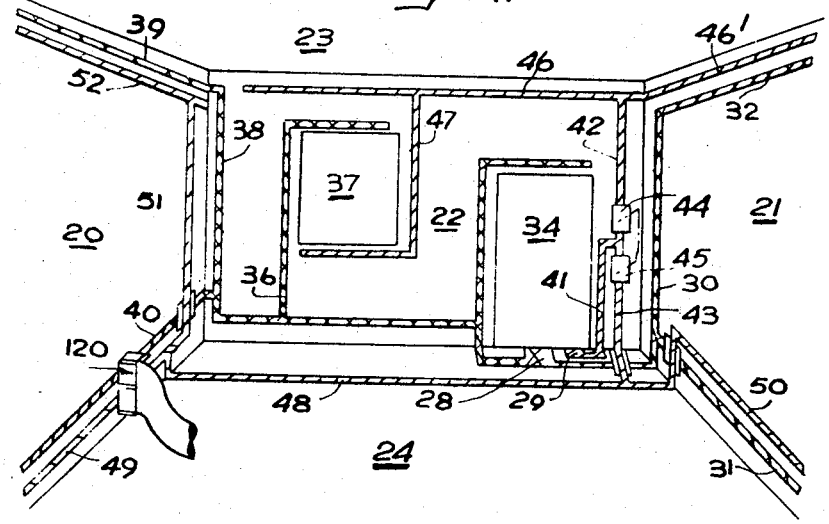
FIG. 1A is a view corresponding to FIG. 1 but showing the disposition of busbars which are employed in the said room.

FIGS. 1, 1A and 1B of the drawings illustrate one electrical space heating system according to the present invention which has been installed in a multi-roomed dwelling house. One of the rooms of the house, many of which are heated in a similar manner, is illustrated in FIG. 1, from which it will be seen that the room has side walls 20, 21, a pair of end walls 22 (only one shown) a ceiling 23, and a floor 24. The ceiling 23 is covered with elongated electrical heating films 25 which are made to resemble, and to serve as, ceiling paper. The walls 20, 21, 22 are papered in the ordinary way with strips 26 of wallpaper, the said strips covering or containing heating films of the kind shown in FIG. 2. Alternatively, the heating films on these walls could be provided with decorative covers. The floor 24 is covered with strips 27 of linoleum, heating films being mounted beneath the linoleum or being embedded therein.

Current is supplied to the various heating films by way of busbars 28, 29. These busbars are shown in FIG. 1A which is a view corresponding to FIG. 1 but showing the arrangement of busbars in the room. The busbar 28 is connected to a busbar 30 which extends vertically up the wall 21, the busbar 30 being connected to horizontally extending busbars 31, 32 which are respectively disposed adjacent the floor 24 and the ceiling 23. The busbar 28 is also connected to a vertically extending busbar 33, which is disposed adjacent a door 34 in the room, and to a busbar 35 which extends horizontally along the wall 22 adjacent to the floor 24.

A busbar 36 extends vertically from the busbar 35 and is disposed adjacent a window 37, while a busbar 38 extends from the busbar 35 and up the wall 22 so as to lead to a busbar 39. Connected to the busbar 38 is a busbar 40 which extends horizontally along the wall 20 and which is disposed adjacent to the floor 24.

The busbar 29 is connected to a busbar 41 which extends vertically alongside the door 34 on the opposite side thereof to the busbar 33, the busbar 41 being connected to busbars 42, 43, by way of switches 44, 45, respectively.

The busbar 42 leads to a busbar 46 which extends horizontally over the walls 21, 22 parallel to and adjacent to the ceiling 23, the part 46' of the busbar 46 which extends across the wall 21 being disposed between the busbar 32 and the ceiling 23. A busbar 47 which extends adjacent to the window 37 is connected to the busbar 46. The busbar 43 is connected to a busbar 48 which extends across the floor 24. The busbar 48 is connected to busbars 49, 50 which extend horizontally across the walls 20, 21 respectively. The busbar 49 is disposed between the busbar 40 and the floor 24 while the busbar 50 is disposed adjacent the busbar 31 but on the side thereof remote from the floor 24. A busbar 51 extends from the busbar 48 and extends vertically up the wall 20 so as to connect with a busbar 52 which extends parallel to and adjacent to the busbar 39 but is disposed on the side thereof remote from the ceiling 23.

The heating films 25 on the ceiling 23 are provided at their opposite ends with connecting strips 53, 54 (FIG. 1) by which they are connected to the busbars 46', 39 respectively.

The heating films on the wall 20 are connected at their top ends to the busbar 39 by the said connecting strips 54, whilst at their bottom ends they are provided with connecting strips 55 by means of which they are connected to the busbar 49.

The heating films on the wall 21 are connected at their top ends to the busbar 46' by the connecting strips 53 whilst at their bottom ends they are provided with connecting strips 56 by means of which they are connected to the busbar 31.

Those heating films on the wall 22 which extend to the ceiling 23 are provided at their top ends with connecting strips 57 which contact the busbar 46. Those heating films on the wall 22 which extend to the floor 24 are provided with connecting strips 58 which contact the busbar 35. The heating films on the wall 22 above the window 37 and door 34 are provided with connecting strips 59, 60 respectively which respectively contact the busbars 36, 33, while the heating films beneath the window 37 are provided with connecting strips 61 which contact the busbar 47.

The heating films in or beneath the lineoleum on the floor 24 are connected at their opposite ends by connecting strips 62, 63 to the busbars 40, 50 respectively.

The busbars illustrated in FIG. 1A are connected to electrical supply sources which are described below. It will therefore be appreciated that when both the switches 44, 45 are closed, all the busbars illustrated in FIG. 1A will be live and therefore all the heating films will be supplied with current. If, however, the switch 44 is open while the switch 45 is closed, then the busbars 42, 46, 46' will no longer be live and the heating films on the walls 21, 22 and the ceiling 23 will not be supplied with current.

The switches 44, 45 are interconnected and are operated by two manually operable levers (FIG. 1B). Thus when it is desired to heat a room e.g. when a person enters the room the manually operable lever "ON" is moved to the closed position with the result that both switches 44 and 45 are closed and all the heating films in the room are supplied with current. The films very rapidly emit radiant heat and since the films cover all the boundary walls of the room, any occupant of the room will be irradiated from all sides and will feel comfortable at once even if the air is cold. The switch 44 is automatically opened (by means described below) either a predetermined length of time after the switches 44, 45 have been closed or when either the walls or the heating films or the room itself reaches a predetermined temperature. From then onwards the room is therefore heated from the heating films provided on the wall 20 and floor 24.

Switches 44 and 45 are represented in FIG. 1B by knife edge switches and connected in accordance with FIG. 1A to busbars 41, 42 and 43 respectively. As already stated, pushing the "ON" lever 220 not only closes switch 44 but switch 45 also because bar 221 connected to 220 pushes lever 222 home. This is the "closed position". If it is required to open both switches manually the "OFF" lever 222, when operated presses against bar 221 and opens switch 44 also.

In the closed position, bar 221 just touches lever 223, a part of the bimetallic strip mechanism which acts as a time delay.

It consists of bimetallic strip 224 with a heating spiral 225 around it. It is connected in series with the variable resistance 226, by which adjustment of delay time can be made. This control circuit is connected across the supply, preferably between points 43 and 28. When after a pre-determined time interval (which will depend in part on ambient conditions) the bimetallic strip 224 snaps into action, this movement releases plate 227 against which the strong spring 228 presses and lever 223 moves forward, disconnecting switch 44 only.

A similar arrangement is provided for each of a plurality of rooms of the house, whereby any room which is entered at any time may be instantaneously "flooded" with heat for an initial period of at least one half minute and not more than ten minutes to thereby make the room comfortable.

The heating films employed on the walls 20, 21, 22, ceiling 23 and floor 24 are illustrated in FIGS. 2 and 2A.

Each film comprises a metallic heating foil 64 which is disposed between two insulating layers 65, 65'. The metallic heating foil 64, as best seen in FIG. 2A, is crimped and (as shown in FIG. 2) the foil is provided with a number of longitudinally extending narrow slits 64' so as to present a meander path to current flowing through the foil 64.

The foil 64 is elastically pre-stressed so that if its cross-section becomes weakened by an accidental hair line crack (or burn or hole) the parts of the foil on opposite sides of the crack will retract so that the circuit is swiftly broken, the layers 65, 65' being such as to permit such retraction.

FIG. 2B illustrates the manner in which an electrical heating film may be connected to a busbar. As shown in FIG. 2B, adjacent heating films 66, 66', 66" have Z-shaped portions at their ends, the folds of these portions normally being prevented from sticking together by the use of a paper or other inlay 67. When it is required to connect the film to a busbar, the inlay 67 is replaced by a connecting strip 67' which is connected to the busbar.

The heating films have very low heat inertia, and therefore warm up very rapidly. However, at the low voltage used (6 or 12 volts, for example) the temperature of these films is quite low—less than 180° F. for wall mounted films even in panels, and not greater than 85° F. for floor mounted films. Thus they are safe to touch since they are low voltage and not very hot.

The switch means shown in FIG. 1B uses knife switches for both switches 44 and 45. FIGS. 3 and 4 illustrate an alternative type of switch 44. Referring to these figures, it will be seen that the switch 44 here comprises a bimetallic member 68 which is mounted by a loop 68' on a pivot not shown and which has a portion passing through a cam 69 which may be rotated by a lever 70, the function of which is to move the member 68 between closed and open positions and serving the same purpose as the lever 220 of FIG. 1B.

The bimetallic member 68 is backed by a block 71 of rubber or other resilient material which carries a resistance foil 72. The top and bottom portions of the resistance foil 72 contact insulating blocks 73, 74 which are respectively carried by portions 42′, 42″ of the busbar 42. When the switch 44 is in the closed position shown in FIG. 3, the resistance foil 72 also contacts foil connectors 75, 76 which are connected to the busbar portions 42′, 42″ respectively. When however, the bimetallic member 68 reaches a predetermined temperature it will automatically snap into the position shown in FIG. 4 in which the foil 72 is out of contact with the foil connectors 75, 76.

It will be appreciated that the passage of current through the resistance foil 72 will raise its temperature at a predetermined speed up to the temperature at which the bimetallic member 68 will cause the switch 44 to snap into the open position. The switch 44 will therefore open a predetermined length of time after it was originally closed.

The bimetallic member 68 could, if desired, be responsive to the temperature of the room rather than to the temperature of the foil 72, which in this case would be made of highly conductive metal, whereby the switch 44 would be opened when the temperature of the room had reached a predetermined value.

As above mentioned FIGS. 1 and 1A illustrate one of a plurality of rooms all similarly equipped. Accordingly the busbars 28, 29 carrying the whole supply to the room, must for all the rooms be connected to some supply ef electrical energy. Also, since as above mentioned, low voltage films are used, an obvious source could be the secondary of a common transformer supplied from the electricity mains. Such transformer must be designed to carry the load represented by the normal low power input to the films of all the rooms plus the extra power input to at least one of the rooms when the films in that room are first switched on. Another supply arrangement better able to cope with extra load, if for example occupants enter and switch on the films of two rooms simultaneously is shown in FIG. 5 comprising a transformer-accumulator arrangement.

Figure 5:
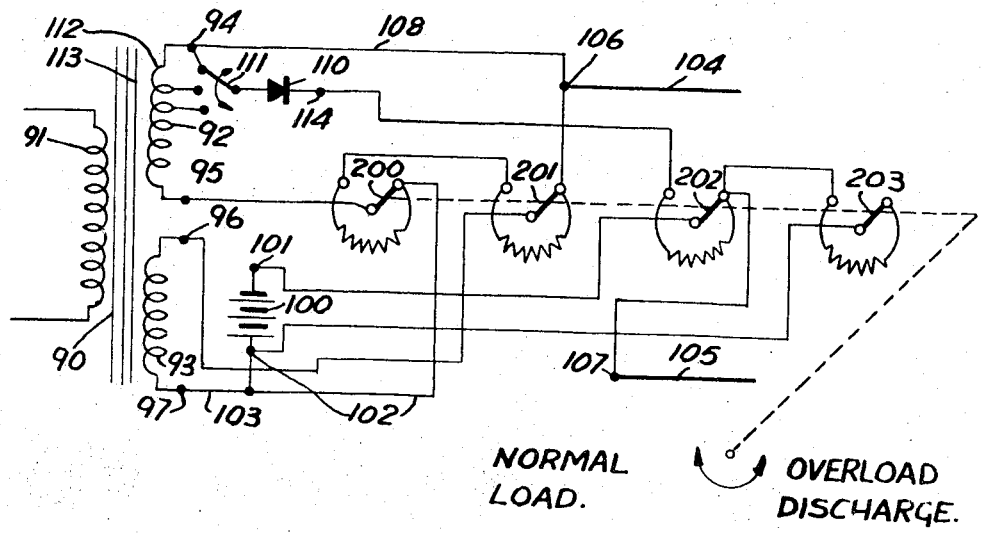
FIG. 5 is a diagrammatic sketch of a transformer and accumulator device by means of which the space heating system may be supplied with current, and a switch means peculiar to this device by which the current to the heaters may be varied.

In FIG. 5 there is shown a transformer 90 whose primary coil 91 is adapted to be connected across a mains supply of 120, 240 or 440 volts. The transformer 90 is provided with two secondary windings 92, 93, the winding 92 being provided with terminals 94, 95, and the winding 93 being provided with terminals 96, 97. The voltage across each of the windings 92, 93 is preferably about 7 volts.

An accumulator 100 has terminals 101, 102, the terminal 102 being permanently connected to terminal 97 by a conductor 103. Busbars 104, 105 having terminals 106, 107 respectively are provided to conduct current from the transformer to the busbars 28, 29 leading to the films of all the rooms to be heated.

The accumulator 100 may be a lead acid type accumulator or an Edison type accumulator whose voltage is not lower than 9 volts at the end of a full discharge.

The terminal 106 is permanently connected to the terminal 94 of the secondary winding 92 by way of a conductor 108.

A rectifier 110 has a sliding contact 111 which is adapted to make contact with tapping points 112, 113 of the secondary winding 92. The rectifier 110, on its side remote from its sliding contact 111, is provided with a terminal 114.

A four pole, two way switch arrangement, 200, 201, 202, 203 serves to interconnect the transformer terminals in two alternative ways. During normal load the four switches are in the "normal load" postion, the movable contacts connecting with the left-hand switch contacts. The secondary windings 92, 93 will therefore be in series and will be supplying the busbars 104, 105. In this setting, the terminal 102 of the accumulator is connected to the busbar 105 while the terminal 101 is connected via the terminal 114 to the rectifier 110. The accumulator will therefore be charged. According to the state of charge of the accumulator 100 and/or of the actual secondary voltage which varies with mains and load conditions, the rectifier 110 automatically selects a tapping suitable to the state of the accumulator charge.

When, however, a heating load is switched on which is in excess of the maximum wattage supplied by the mains, the switches are moved to the "overload discharge" position and the movable contacts are connecting with the right-hand switch contacts as shown in FIG. 5. The windings 92, 93 will therefore be in parallel, the rectifier 110 will be disconnected from the accumulator 100, and the accumulator 100 will be placed in series with the two paralleled transformer windings. The A.C. voltage from the transformer windings 92, 93 drops from 7 volts to 6.3 volts or less. This, however, is the RMS voltage. The maximum A.C. voltage is higher (by a factor of $\sqrt{2}$ if the transformer gives a pure sinusoidal output). The values given for purposes of illustration are therefore a sufficient safeguard that the current through the accumulator 100 never flows in a reverse direction during the discharge and that the busbars 104, 105 are supplied with a pulsed D.C., the pulses being of half mains frequency with a maximum value slightly higher than at normal load conditions and a minimum above zero.

The arrangement described above produces a maximum temproary supply to the installation by more than doubling the maximum current available at a slightly higher voltage without switching over to D. C., without switching cell groups within the accumulator, and without providing a large rectifier.

It will be clear that in itself the circuit of FIG. 5 is independent of the switches 44, 45 of FIGS. 1, 1A and 1B but is made to respond (as described below with reference of FIG. 6) to the load which the heating films present to the supply. Thus the parameters may be such that when the switch 44 of only one room is closed the load is insufficient to bring in the battery to augment the transformer, but if the switches 44 of two rooms are closed the battery is brought in, or the battery may be brought in every time a switch 44 is closed. Also, in FIGS. 1, 1A and 1B control of heat input is by switching part of the film of any one room on and off, but as described below, voltage control or switching groups of the films in one room into parallel or series may be employed and the arrangement of FIG. 5 can be used in such cases.

Figure 6:
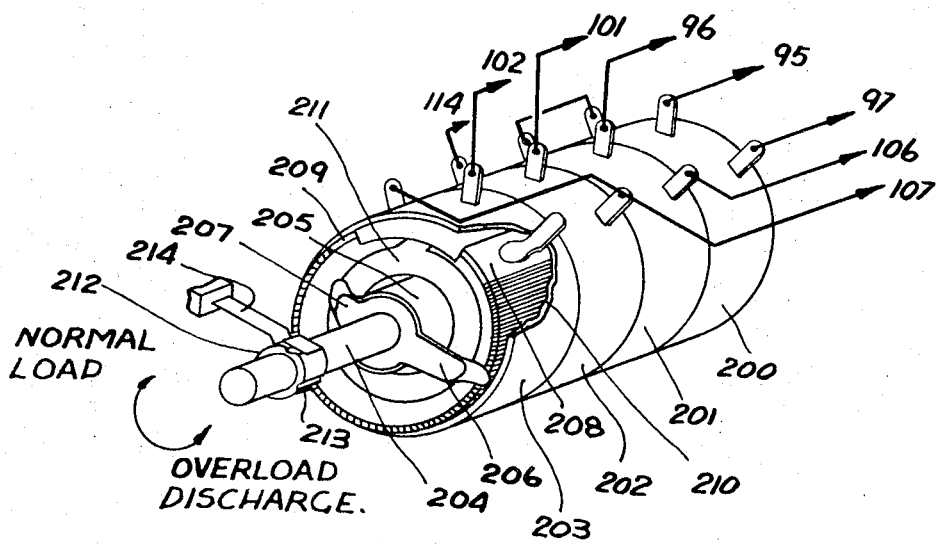
FIG. 6 is a diagrammatic representation of a form of wiper switch which the switch means of FIG. 5 may take.

In FIG. 6 there is shown a practical example of this switch arrangement. The four identical sections 200, 201, 202, 203 are stacked to form one assembly unit, very much like a conventional ganged potentiometer.

In each section there is fixed to the insulating axle 204 a metallic cylinder 205 with two wiper contacts 206, 207.

The longer one 206 travels between the end-contacts 208, 209 along a strip of resistive material 210 of approximately 100 ohm resistance. The shorter one 207 makes contact all the time with a metal ring 211 representing the movable contact member of this switch arrangement.

Another small metal cylinder 212 on the axle 204, having three grooves 213 serves in connection with a spring 214 as indexing device to indicate the two end-positions and centre position of the switch.

The movement of the wiper contact between the normal load and overload position may be effected manually, or by a solenoid and lever arrangement as described below with reference to FIG. 6A or a bimetallic strip (as described with reference to FIG. 1B or FIGS. 3 and 4) the heater of which is connected across the busbars 104, 105.

The control arrangements above described with reference to FIGS. 1, 1A and 1B are based on varying the area of film which is energized between normal and full power supply. Instead as previously mentioned control may by varying the supply voltage. The control arrangement may be such that a normal six volt supply is provided for all the films in one room, this being doubled to twelve volts during the intial period, to thereby provide four times the heat input.

One of the many obvious ways possible to achieve this is shown in FIG. 6A. This depicts a series-parallel switch 79 by which the two 6 volt secondary windings 92′, 93′ of a transformer 90′ are connected in series as shown, feeding 12 volts into the circuit lines 104′, 105′ until actuated by a time relay 80, a solenoid 81 pulls the switch 79 into the parallel position (shown in dotted lines). The two 6 volt windings are then in parallel, feeding only 6 volts into the circuit lines 104′, 105′.

The use of a low voltage supply means that there will be heavy currents and it is for this reason that foil busbars are used in the space heating system described herein.

A socket 120 (see FIGS. 1 and 1A) is provided for enabling an electrical appliance (not shown) to be supplied with current from the busbars 40, 49. Similar sockets can, of course, be provided across other busbars.

Figure 7:
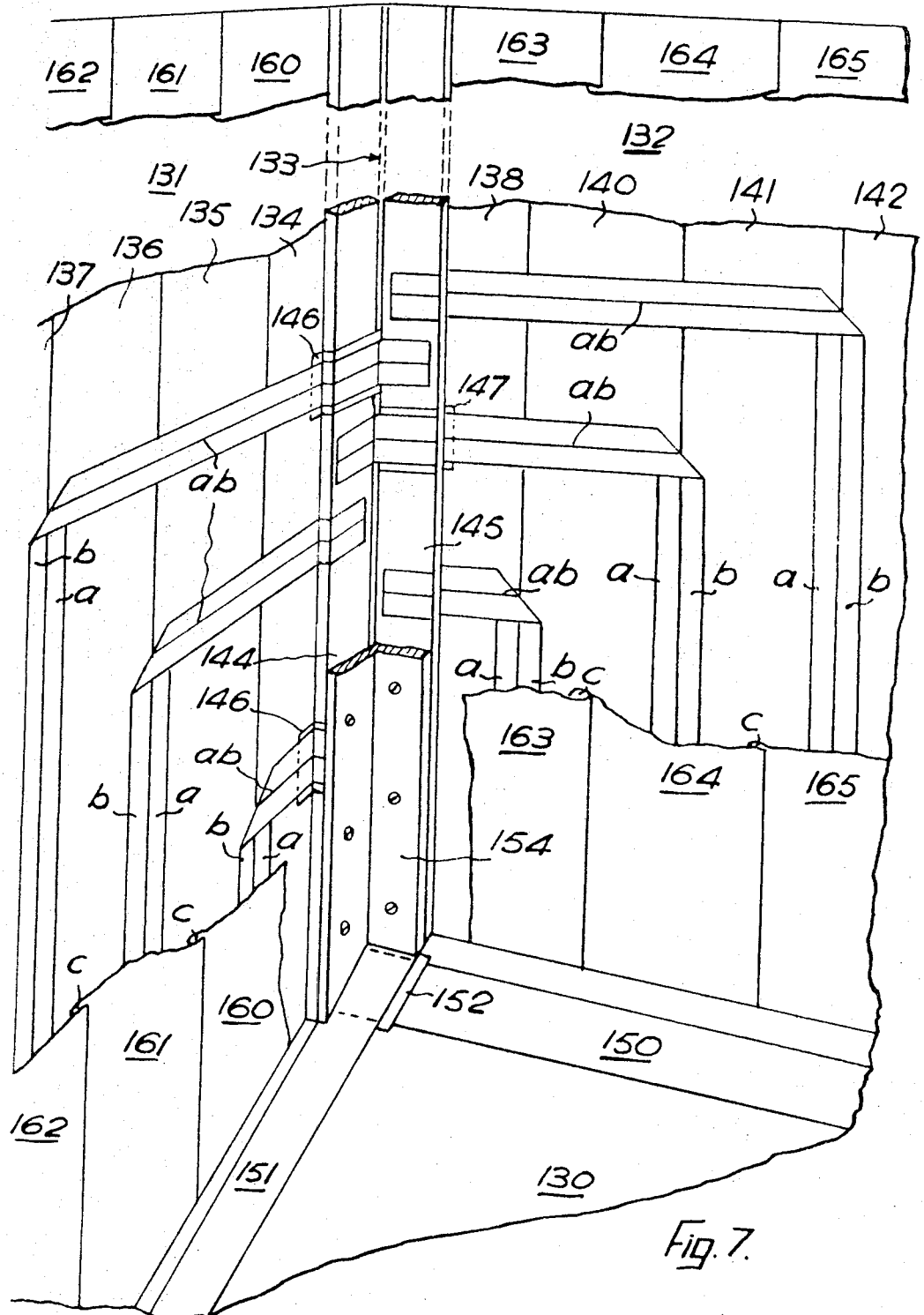
FIG. 7 is a diagrammatic general view of an alternative space heating system according to the present invention.

Referring now to FIG. 7, there is shown an alternative, and preferred, manner of arranging the heating films within each of a plurality of rooms of a house, the control circuitry being of the type shown in FIG. 6. The room shown comprises a floor 130 and walls of which two adjacent walls 131, 132 are shown. The adjacent walls 131, 132 define between them a corner 133 of the room.

Attached to wall 131 are heating foils of which four, 134, 135, 136 and 137 are shown. Attached to wall 132 are heating films of which four, 138, 140, 141, and 142 are shown. The heating films extend from the ceiling to the floor 130, and abut one another such that they cover the whole of the wall surface.

The conductive pattern of the films in this drawing (as well as in FIG. 1) is on the lines of that described with reference to FIG. 2. This pattern comprises a succession of meander paths in parallel. The film must incorporate at least along two edges perpendicular to the slots 64′, continuous terminal areas of sufficient width to carry the necessary current without substantial voltage drop along the terminal areas, which to reduce the width they occupy may be folded over. In FIG. 7 the meander patterns are horizontally disposed and the terminal areas vertically disposed. A strip of terminal area along each vertical side $a$ and $b$ respectively is separated from the rest of the terminal zone by a vertical cut extending by way of example downwardly from the top in FIG. 7 though it might extend equally well upwards from the bottom. The cuts extend about half the height of the foil. The strip must be adequate to carry the current and may be reduced to a narrow width by folding and the unsevered part of the terminal area must also be adequate to carry the current. Adjacent strips $a$ and $b$ of adjacent films contact one another to form conductors $ab$, and these are bent at right angles to their normal vertical orientations and laid horizontally across the heating films towards the corner 133. Alternate conductors $ab$ are connected to metal conductors 144, 145 respectively. Thus one strip $a$ or $b$ of each foil is attached to conductor 144 and one strip $a$ or $b$ of each foil is attached to conductor 145. Where conductors $ab$ cross conductors 144 to reach conductor 145, insulating foil 146 is provided to insulate the crossing members. Where conductors $ab$ cross conductor 145 to each conductor 144, insulating foil 147 is provided to insulate the crossing members.

Conductors 144 and 145 extend from the ceiling to the floor of the room and, at the floor 130, they are attached to foil busbars 150, 151 respectively. These foil busbars are laid across the floor, extending along each of the walls 131, 132. The foil busbars are connected to the positive and negative terminals of a D.C. supply or to the terminals of an A.C. supply which provides electric power for the films, under the control of switch gear such as that above described with reference to FIGS. 5 and 6. The foil busbars 150, 151 are separated by an insulating foil 152 where they cross and are covered by linoleum or carpeting without any special protection being required. Extending over and completely covering the conductors 144, 145 is an angle member 154 which is disposed in the corner 133 and is secured to the walls 131, 132 fixing the conductors in place.

It will be appreciated that current supplied through foil busbars 150, 151 will be fed to conductors 144, 145 and thence to the terminal areas on the opposite sides of each heating film. Although shown spread out for clarity in FIG. 7, since as above described the vertical cuts extend about half-way, the horizontal part of each conductor $ab$ is actually disposed at approximately the mid-height of the room.

Since the meander pattern is in general uniformly distributed, the terminal areas are of negligible resistance and the current is conveyed to approximately the midpoint of each side, the full current carried by the horizontal parts of the conductors $ab$ will be divided substantially equally one half flowing into the part of the terminal areas above the midpoints of the sides and the other half into the part of the terminal areas below the midpoints of the sides; the value of the current in the terminal areas will fall off substantially uniformly from the midpoints to zero at the upper and lower ends. In FIGS. 1 and 2 the current is supplied to the terminal areas at the ends and thus falls from full value carried by the supply busbars at one end to zero at the other whereas in the present arrangement of FIG. 7 it falls off from half the full value supplied at the centre towards both ends and the maximum load carried by the terminal areas is about half that of FIG. 1, other conditions being equal.

Over the abutting heating films on each wall 131 and 132, wallpaper is fixed. Consecutive strips 160, 161, 162 and 163, 164, 165, overlap one another, as shown at "C." By overlapping the wallpaper strips, excess paper is provided to permit expansion of the paper, upon being heated, and subsequent shrinkage, upon being cooled. With abutting papers, gaps may appear due to shrinkage of the papers, and these spoil the appearance of the decorated wall.

There are various ways in which the heating films may be mounted on the wall. FIG. 8 illustrates in detail an arrangement in which all modifications suggested in this specification are included. As shown, the heating foils 135, 136 and wallpaper 160, 161, 162 etc. are not mounted directly on wall 131, but are spaced therefrom by further members. Mounted directly on the wall 131 is a relatively thin insulating layer 170. Mounted on this layer is a wall heater 171 comprising a heating foil 172 sandwiched between two layers of insulating paper 173, 174. Mounted on the wall heater 171 is a relatively thick insulating layer 175 on which is mounted a non-dentable layer 176 which protects the layer 175 from being dented. Mounted on the non-dentable layer 176 is the space heater 177 comprising the heating foils 135, 136 etc. sandwiched between insulating paper 180, 181. Finally, the wallpaper 160, 161, 162 etc. is fixed over the space heater 177.

The relatively thick insulating layer 175 is formed of foamed or expanded synthetic resin materials or of corrugated paper, or any such material having a high air/solid ratio and thus forming a good insulator. The insulation provided by layer 175 is chosen whereby its thermal transmittance is such that the total heat e.g. expressed in watts per square foot of surface area transmitted through it from the space heater 177, in the initial period of less than ten minutes, is very much less than the total energy, also expressed in watts, per square foot of surface area supplied to the heating foils 135, 136 etc. during the same period. Thus all the power supplied to the heating film of the space heater 177 cannot be transmitted through insulating layer 175, and some must therefore be radiated into the room. Since the heat supplied to the room from films 135, 136 etc. is by radiation whereas that transmitted through layer 175 is by conduction, appreciably more heat will pass to the room since the amount of heat radiated varies in accordance with the fourth power of the temperature of the films whereas the amount of heat conducted varies directly with temperature.

In operation, the wall heater 171 is preferably supplied with electrical power continuously, whereby the whole assembly of components shown in FIG. 8 is maintained at a predetermined temperature. The heat supplied by heater 171 is "stored" in the wall 131 and also serves to keep the insulating layer 175 and space heater 177 a few degrees above ambient temperature.

When a person enters the room, power is supplied to films 136, 135 etc. of space heater 177 for a maximum of ten minutes whereby heat is instantly radiated into the room. Layer 175 prevents much heat being conducted to wall 131 immediately, and wall heater 171 also aids in this task. The wall heater 171 acts as a heat barrier or weir, which prevents heat being conducted to wall 131 until the temperature gradient across the insulating layer 175 has been raised sufficiently above the temperature of wall heater 171. Until this time, substantially all power supplied to space heater 177 will be radiated into the room, and after this time a proportion of the heat will also be conducted to the wall 131. This conducted heat is not "wasted," since although it does not warm the room directly, it serves to warm the wall 131 and thus becomes stored therein. In a multi-room heater all heat generated within the house is used to maintain the house at a reasonable temperature, and the conducted heat aids in maintaining the "shell" or wall structure warm.

The wall heater 171 and accompanying insulating layer 170 need not be employed at all. Insulating layer 175 could be mounted directly on wall 131 and the space heater 177, wallpaper 161 etc., and non-dentable layer 176 mounted thereon. Without wall heater 171, the space heater 177 is operated in the manner indicated with reference to FIGS. 1 and 2. Thus the power supplied to the heating films 135, 136 etc. may be varied and/or the number of films used may be varied to flood the room with heat during the initial period and thereafter to reduce the power output in the manner described with reference to FIG. 5 or 6.

On all walls other than external walls, even the insulating layer 175 need not be used. Thus the space heater 177 could be mounted directly on the wall 131, or mounted on a relatively thin insulating layer such as 170. The insulation will not be as good in these conditions, but since it would be used on internal walls only, the heat conducted to the walls will not be lost, but will be stored in the walls as explained above.

Where the insulating layer 175 and its nondentable covering layer 176 is employed, the layer 176 is chosen such that its extensibility is smaller than the maximum extensibility of any of the layers covering it i.e. any of the foils 135, 136, paper coverings 180, 181 and wallpaper 160, 161, 162 etc. By this means, the non-dentable layer 175 will always be the first member of the combined structure to rupture due to extension of the structure, and thus the remainder of the covering members will remain intact.

Referring now to FIGS. 9A, B, C and D, there is shown a further heating film arrangement according to the present invention. As shown, there is provided an extendable film 180 having a decorative covering to form a decorative scroll, blind, or curtain, which is supported, in its coiled form, by an arm 181 attached to a wall 182 of the room to be heated. When it is desired to use the heating film to heat the room, it is extended until it covers the wall 182, as shown in FIG 9B. Its free end is attached, by a spring clip 183 to a second arm 184. Electrical power is supplied to terminals attached to arms 181, 184 and thus the film 180 emits heat to warm the room. Power cannot be supplied to the film until the free end of the film is connected to spring clip 183, and thus a safety device is incorporated in the system since the full power cannot be supplied until the film 180 is fully extended.

The film 180 may take the form of space heater 177 of FIG. 8 or of the heating film of FIGS. 2A and B. An insulating layer may be supplied between the foil and the wall 182. Alternatively an insulation having variable thermal transmittance properties may be employed. Thus, as shown in FIGS. 9B and C and FIG. 10, an inflatable member 185 may be disposed between the film 180 and wall 182, attached to film 180. By inflating or deflating the member 185, its thermal transmittance may be readily varied, and thus the effectiveness of the insulation may be varied. This may be used as a method of flooding the room with heat and subsequently reducing the heat supplied to the rooms by the films (i.e. after the initial period of ten minutes). With a constant power input to the films, the proportion of power radiated as heat into the room and conducted as heat into wall 182 may be readily varied by inflating and deflating member 185. Thus member 185 could be inflated during said initial period, thereby increasing the proportion of heat radiated into said room and decreasing the proportion of heat conducted into the wall, and could then be deflated after said initial period.

An obvious arrangement of this is illustrated by FIG. 9D. The inflatable member 185 is connected to an air supply via a piston type air valve 83 and line 85. This air valve 83 is coupled to a solenoid 84 and upon clip 183 coming into operation, i.e. with current flowing, the coil of the solenoid 84 is energized and pulls the piston of the air valve 83 into a right hand position, allowing the air flow through line 85 to inflate number 185. At the same time a bimetallic time switch 86 is connected into the circuit containing solenoid 84 and after a predetermined time will operate. Its two contacts will open, the solenoid 84 will be de-energized, its plunger will be pushed back by a spring (not shown) to its initial position, driving the air valve piston to the exhaust position, thereby deflating 185. The bimetallic time switch 86 illustrated schematically, operates like a thermostatic switch with the addition of a thin insulating blade 86' which drops between the contacts 86' after they have separated, thus preventing a re-closing of the circuit unless the switch 86 is reset. The knob 87 shown indicates the time adjustment and resetting mechanism for the switch 86''.

The inflatable member 185 need not be used only with collapsible films such as 180 disclosed in FIGS. 9C and D, but could also be used with permanently extended films.

The extendable films 180 disclosed above could be used on portable screens which form temporary wall surfaces of a room. Thus temporary partitions may be provided with collapsible heating element 180 and the partitions could then replace wall 182 in the arrangement of FIGS. 9A through 9D.

It will be appreciated that the general idea of increasing the air space between a heating film e.g. 180 and an adjacent wall e.g. 182 may be achieved by means other than the inflatable member 185 disclosed. Thus the heating film could be mounted on arms which swing it towards and away from the wall.

Other devices of variable thermal transmittance and in particular which enable the radiation from the film into the room to be controlled are possible. In general they are louvres and may comprise slats of thermally insulating material with at least one heat reflecting surface or like structures which constitute variable radiation windows, and which may also serve to control and direct convective heating. Thus as shown in FIGS. 11 and 12 a device after the fashion of a venetian blind may be used comprising a series of slats 191 pivoted along their front edges i.e. their edges remote from the wall 192 provided with the heating film diagrammatically indicated at 193, so that in the position of FIG. 11 the slats extend substantially perpendicular to the wall, leaving openings between them through which heat can be freely radiated over practically the whole area of the film while in the position shown in FIG. 12 the whole area of the film is covered up.

The slats cover not only the area of the film but also some wall surface 194 surrounding the film which is warmed by the heat flow through the wall, through the air or through radiation reflected from the slats. The slats are carried in a frame 195 fixed to or positioned against the wall. This frame forms an obstacle to air movement parallel to the wall into or out of the narrow space 196 between the wall and the slats when they are closed (FIG. 12).

The back of the wall is thermally insulated at 197 unless it is desired to dissipate heat into the space behind the wall as well. In this case the insulation at the back of the wall is dimensioned to give the desired degree of thermal transmittance into the space behind and, preferably, a similar slatted structure is provided there, not necessarily including a heating film.

It is preferable to arrange for a wide angle of heat radiation to any occupant in the room, for instance by having similar louvres on more than one wall in a room. If the wall is a cavity wall the inside leaf often provides a suitable heat storage capacity and the space below the window-sill is also often convenient for this purpose. The cavity may be filled for example by injecting urea formaldehyde foam.

When furniture or other obstacles occupy a place in front of the louvre structure the slats may be operated (as described below) so as to give convective heat release from the wall rather than radiant heat although indirect radiation is a useful way of raising the comfort level of the occupant as well.

Desirably the rear surface 198 of the slats i.e. the surface which faces downwardly in FIG. 11 and towards the wall in FIG. 12 is reflective being for example coated with aluminium foil, so that in the position of FIG. 12 or any position between those of FIGS. 11 and 12 the whole or a proportion of the heat radiated by the film 193 is directed back towards the wall. If the film continues to be energized in the position of FIG. 12, substantially the whole of the heat developed will be transmitted to the wall 192 and be stored therein, so that next time the room is to be flooded the heat developed and directly radiated by the film will be supplemented by the heat stored in the wall and radiated back into the room between the slats.

The device is particularly suitable as a night storage heater, as the slats can cover a sufficiently large area 194 of the wall round the film 193 to reduce leakage during the charging period, i.e. the night, to a low level while the whole room can still be flooded with heat by exposure of the hot wall even while the heating film is switched off.

Any convenient known arrangement may be used to adjust the slats and may provide for them to be set not only in either of the positions shown in FIGS. 11 and 12 respectively, but also any intermediate position.

A preferred arrangement for holding and moving the slats is that which is normally used with venetian blinds in which each slat 191 is slipped between at least two loops 199, 201, each of which is fixed to two cords 202, 203, running vertically past the front and rear edges respectively of the slats near their ends. A vertical movement of the cords in opposite direction will turn the slats. If as shown the front cord 202 is not moved, an up or down movement of the rear cord 203 can effect an adjustment of the slats through an angle of almost 180° just as if the slats were mechanically pivoted at their front edges. Instead of cords 202, 203, tapes, wires, rods or decorative chains can be used, and the slats can be secured to these pair of vertical members by other means than the loops referred to above.

Solely by way of example, the rear cord 203 is shown led to a hand winch 204 for adjustment, the weight of the slats serving to keep the cord taut.

FIGS. 11 and 12 show the slats disposed close to the film 193 when open and are concerned primarily with the control of radiation. However, the heating film and the heated wall around it can give rise to convective heating as well and the slats 191a can be arranged to control this also. To this end and as in FIG. 13 the pivots are located sufficiently spaced from the film 193a so that a space 205 is left in which a current of air can move and the slats 191a are adjustable over a greater angle so that they can take a position as shown in the upper part of the figure or even higher which directs rising warm air outwardly into the room. This convective circulation may be enhanced by adjusting the lower slats 191b as shown to direct cooler air into the space 205. Accordingly the upper slats and the lower slats are supported in separate sets of cords 202a, 203a and 202b, 203b so that the two groups can be separately adjusted. There might even be three or more groups so that a proportion of the slats between the uppermost group and the lowermost group could be turned into the position shown in FIG. 11 in which maximum radiation between them is provided for.

Indeed, where a larger portion of a wall is covered by louvre structures it is desirable to provide these in units each of which permits a different group movement of its slats so that the optimum heat distribution from the hot wall can be arranged. Thus behind furniture the slats may be operated to give convection heat only while in the unobstructed areas the slats may simultaneously be put in the radiation only position.

The front surface of the slats may be decorated so that the decorative design forms a picture or a desired pattern when the slats are closed as in FIG. 12 (or 17 to be described) which may or may not be related to the decoration of the film 193 and/or the wall 192. The effect of the decorated slats when opened fully as in FIG. 11 (or 16 to be described), or an intermediate position as in FIG. 13 and the provision of electric light within the frame of the structure (as indicated at 205a, FIGS. 11 and 12) can also be taken into consideration.

A preferred method of production of the slats for the venetian blind arrangement of FIGS. 10 to 13 uses a paper printed as shown in FIG. 14 with a design in stripes 206 spaced at a pitch equal to the circumference of the slat cross-section, with heat reflective stripes 207 of slat width printed or stuck between the spaced decorative stripes, and with the narrow intervals 208 of slat thickness width between the stripes and also decorated. The back of this paper is coated with an adhesive and slat width strips 209 of thermal insulation material, e.g. stiff corrugated cardboard (triplicate), honeycomb laminates, cellular plastic or glass etc., are stuck at the back of the wide stripes 206. The paper is then slit, preferably in the reflective stripes 207 as at 211 and folded round the strip 209 of insulating material so as to envelop it fully, as shown in FIG. 15. This method lends itself to full automatisation and can be carried out with paper drawn from wide reels.

Another possible louvre structure is a slat arrangement shown in FIGS. 16 and 17 comprising a stationary grid 212 adjacent the wall and a grid 213 movable over the grid 212. The grid 212 comprises slats 214 and the grid 213 slats 215. The slats 214, 215 are equal in width and this width is equal to or slightly greater than the spaces between the slats. In the position of the grids shown in FIG. 16 with the slats 214 and 215 superposed the spaces between are left clear for radiation, while in the position of FIG. 17 in which the slats of one grid are over the slats of the other, radiation is completely obstructed. The surface nearer the wall of both grids is made reflective as by a coating of aluminium foil 216. It will be clear that in this arrangement the maximum opening for radiation is half or a little less than half of the total area.

As in the previous example any suitable known means may be used for adjusting the movable grid, for example a lever operated by a solenoid or a cord and winch as in FIGS. 11 to 13 could be used.

It will also be clear that the adjusting means for both FIGS. 11 to 13 and FIGS. 16 and 17 may be associated with switching means and temperature sensitive control means (as described above) so that the adjustment of the slats can be effected in accordance with the conditions required in the room including initial flooding followed automatically by a reduction in the supply of heat into the room after a predetermined interval.

In any of the arrangements described above, the heating films used have gaps in the metallic layer between adjacent arms of the meander patterns with which they are provided. These gaps may be filled with impermeable flexible insulating material to thereby make the heating films a vapour barrier. Such films will then prevent surface and interstitial condensation both when switched on and when switched off.

Any of the paper insulating layers, the relatively thick or relatively thin insulating layers 175, 170, the wallpaper and/or the non-dentable layer 176 may be formed of flame proof or fire proof material, thereby enhancing the fire resistant properties of the arrangement.

The use of thermally insulating materials also generally aids sound insulation of a room, since the materials such as that used for layer 175 or 185 are usually efficient insulators for both heat and sound.

It will be appreciated that each room to be heated in the multi-roomed dwelling referred to above, will be provided with heating films as described with reference to FIGS. 1 and 2 or 7 and 8 and/or 9 or 10 to 13 or 16 and 17 and will be provided with a circuit and switchgear as described above. Thus all the rooms may be provided with a small amount of heat at most times, or with no heat at all, and then when a person enters one of the rooms, that room can be "flooded" with heat for a period of time between one half and ten minutes, in which time the room becomes comfortable. The heat input is then reduced, manually or automatically, and a reduced input may be provided whilst the room is occupied. When the person leaves the room, the heat input is reduced to the small amount mentioned above, or is reduced to zero.

A manual switch device may be situated in each room or in the passage or path to each room. The latter case provides a small delay between switching on and the person entering the room, whereby "flooding" will have commenced by the time the person enters the room, and the person will thereby reach a comfortable temperature more quickly.

Thus a multi-room system is provided, whereby any one room may be instantly warmed and raised to an acceptable temperature within a few minutes, the input then being reduced, while unoccupied rooms remain with low or no heating.

What is claimed is:

1. Electrical space heating system extending over and serving for heating a plurality of rooms, comprising at least one layer of thermal insulation covering at least a major portion of the total boundary surface area of each of said rooms, electrical heating film means covering substantially the whole area of said insulating layer, electrical power supply means for supplying said electrical heating film means with electrical power, switch means associated with each room, individually operable by the occupants when any one room is to be occupied, for connecting the electrical heating film means in said one room to said power supply means without affecting the energisation of the film means in any of the other rooms and thus raising the heating film means in that room to a safe temperature at which it nevertheless emits radiant heat at a given high rate, and control means operating automatically after an initial period of between one half and ten minutes to reduce the total heat output from said heating film means in said one room whereby said one room is thereafter continuously supplied with heat at a substantially reduced total rate of heat input.

2. Electrical space heating system as set forth in claim 1 wherein said control means when it operates automatically reduces the power supply to said film means.

3. Electrical space heating system as set forth in claim 1 wherein said control means when it operates automatically disconnects a part of said film means from the power supply.

4. Electrical space heating system as set forth in claim 1 wherein said control means when it operates automatically reduces the voltage of the supply to the heating film means.

5. Electrical space heating system as set forth in claim 1 also comprising insulating material disposed between said film means and said boundary surfaces, the thermal transmittance of said insulating material being such that during said initial period the heat transmitted through said insulation per unit area is less than half the heat supplied by said film means per unit area.

6. Electrical space heating system as set forth in claim 1 also comprising dentable insulating material disposed between said film means and said boundary surfaces, and non-dentable material disposed between said insulating material and said film means and protecting said dentable insulating material.

7. Electrical space heating system as set forth in claim 1 also comprising decorative material covering said film means, dentable insulating material disposed between said film means and said boundary surface, non-dentable material disposed between said insulating material and said film means and protecting said dentable material, the extensibility of said non-dentable material being less than the extensibility of the heating film means and of the decorative material.

8. Electrical space heating system as set forth in claim 1 also comprising a plurality of strips of decorative material covering said film means, adjacent strips of said material marginally overlapping one another.

9. Electrical space heating system as set forth in claim 1 also comprising insulating means disposed between said film means and said surface, and wherein said control switch means when it operates automatically increases the rate of heat transfer through said insulating means and thereby reduces the heat output from said heating film means into said one room.

10. Electrical space heating system as set forth in claim 1 wherein said individually operable switch means serves not only to connect the electrical heating film means to the power supply but also to space the film means a predetermined distance from the boundary surface it covers during the period of emission at a high rate, and said control switch means when it operates automatically reduces the spacing of the film means from the surface it covers to a value below said predetermined distance.

11. Electrical space heating system as set forth in claim 1 wherein said heating film means includes first and second foils and a thermally insulating material disposed between said foils, the first heating foil being outermost facing the space to be heated, and the second heating foil being innermost, adjacent said boundary surface, and wherein said indivdually operable switch means connects both said foils to the power source, while said control switch means when it operates reduces the power supply to both said foils.

12. Electrical space heating system as set forth in claim 11 also comprising a second thermally insulating material disposed between said second heating foil and the adjacent boundary surface.

13. Electrical space heating system as set forth in claim 1 wherein said heating film means is collapsible, and the system also includes means for extending said heating film means whereby it covers the boundary surface, and switching means which disconnects the film means when it is not extended.

14. Electrical space heating system as set forth in claim 1 wherein said heating film means extends over two boundary surfaces adjoining at a corner of the room, the system also including common busbars in the said corner and leads extending from said busbars to the film means on both said adjoining boundary surfaces.

15. Electrical space heating system as set forth in claim 1 wherein said film means comprising a plurality of heating foils each having terminal areas extending along opposite edges and wherein the power supply is carried to said terminal area at points at least approximately at the mid length thereof.

16. Electrical space heating system as set forth in claim 1 also comprising a system of insulating slats having reflective rear surfaces spaced in front of at least a part of the heating film means, and means for moving the slats between a position in which radiant heat can be emitted between the slats and a position in which the slats bar the emission of radiant heat and reflect it back.

17. Electrical space heating system as set forth in claim 16 wherein said slat system is surrounded by a frame to constitute an air space which is closed when the slats are closed and said slots are pivoted whereby they can be brought into positions directing convective air flow between said space and the space in the room.

18. Electrical space heating system as set forth in claim 16 wherein the system of slats is of an area such as to control radiation from an area of wall not covered by heating film means.

19. Electrical space heating system extending over and serving for heating a plurality of rooms, comprising electrical heating film means carried by and covering at least a major portion of the total boundary surface area of each of said rooms, electrical power supply means, including a main power-source and a subsidiary power source, for supplying said electrical heating film means with electrical power, said main power source being adequate alone to supply the system, at its normal loading, switch means associated with each room individually operable by the occupants when any room is to be occupied, for connecting the electrical heating film means in said one room to said power supply means without affecting the energisation of the film means in any other room and thus raising the heating film means in that room to a safe temperature at which it nevertheless emits radiant heat at a given high rate, control means operating automatically after an initial period of between one half and ten minutes to reduce the total heat output from said heating film means in said one room whereby said one room is thereafter continuously supplied with heat at a substantially reduced total rate of heat input, and means for bringing said subsidiary power source into operation when the loading of the system exceeds the normal value.

References Cited

UNITED STATES PATENTS

| | | | |
|---|---|---|---|
| 982,462 | 1/1911 | Beckstrom | 219—412 |
| 2,110,727 | 3/1938 | Heinisch et al. | 219—488 |
| 2,502,147 | 3/1950 | Grothouse | 219—345 |
| 2,698,893 | 1/1955 | Ballard | 219—217 |
| 2,984,728 | 5/1961 | Murphy | 219—345X |

FOREIGN PATENTS 165,085  1/1934  Switzerland.

C. L. ALBRITTON, Assistant Examiner

ANTHONY BARTIS, Primary Examiner

U.S. Cl. X.R.

219—339, 358, 482, 488, 489